June 11, 1935. D. T. SIEGEL Re. 19,607

RHEOSTAT POTENTIOMETER AND METHOD OF CONSTRUCTING THE SAME

Original Filed March 4, 1932

Inventor
David T. Siegel

Witness
Arthur M. Frambe.

by Rummler, Rummler & Woodworth
Attys.

Reissued June 11, 1935

Re. 19,607

UNITED STATES PATENT OFFICE 19,607

RHEOSTAT POTENTIOMETER AND METHOD OF CONSTRUCTING THE SAME

David T. Siegel, Chicago, Ill.

Original No. 1,942,495, dated January 9, 1934, Serial No. 596,787, March 4, 1932. Application for reissue November 7, 1934, Serial No. 751,917

5 Claims. (Cl. 201—56)

This invention relates to improved resistance devices, particularly potentiometers or rheostats, comprising a dielectric structure in which the base and wound core are fused into an integral unit.

The main object of my improved device is to provide a unit structure in which the base becomes an integral part of the core, increasing the effective radiating surface for the dissipation of the heat generated; and further to provide a structure in which the resistance element stays in fixed position independent of its expansion; to provide a core which can be wound in equal or progressive sizes of wire and later fused into a unit ceramic structure with a base; to provide a heat treatment in forming the unit structure which stabilizes the resistance; to provide a structure which is rigid and forms a protection for the resistance element; to provide contacting surfaces on a resistance element embedded in a ceramic structure; to provide an improved contact maker capable of maintaining a clean smooth surface on the resistance wire; to provide in the ceramic structure limits to the swing of the sweeper arm; to provide a self-adjusting non-arcing brush or contactor; and to provide improved means for maintaining efficient electrical connection between the resistance wire and the contactor arm.

An illustrative embodiment of my invention is shown in the accompanying drawing in which.

In the form of my improved rheostat shown, the unit ceramic part is constructed by assembling a circular porcelain base 1 and a split porcelain ring 2 having flattened sides. A seat for the split or cutout ring 2 is formed in the base 1 by a ledge 3, a cone-shaped raised center 4, and a radial raised arm.

Figure 1:
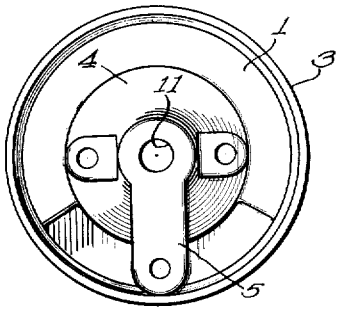
Figure 1 is a plan view of a porcelain base forming part of the resistance device.
Figure 2:
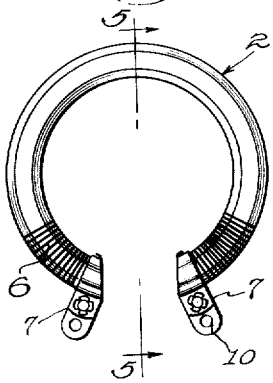
Fig. 2 is a plan view of a porcelain core with metal terminals attached and windings shown in part.
Figure 3:
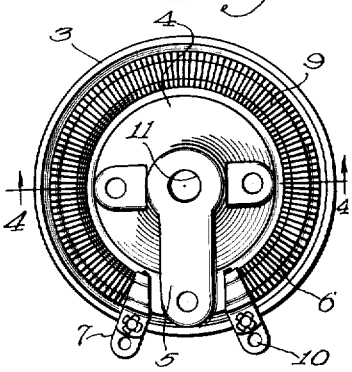
Fig. 3 is a plan view of a porcelain base with the core seated in place.
Figure 4:
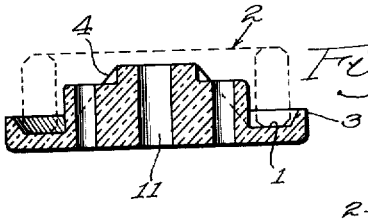
Fig. 4 is a section taken on the line 4—4 of Fig. 3, showing the core in dotted lines.
Figure 5:
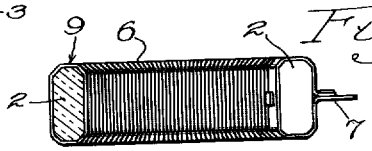
Fig. 5 is a section on the line 5—5 of Fig. 2.
Figure 6:
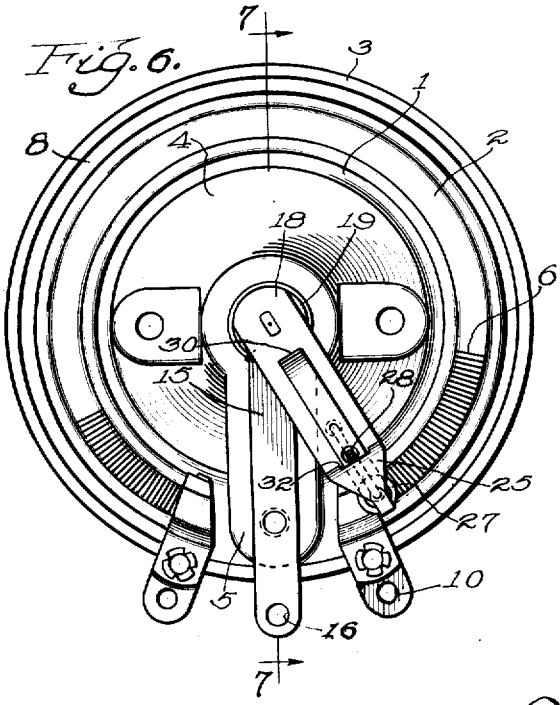
Fig. 6 is a plan view of a complete assembly of a potentiometer rheostat.
Figure 7:
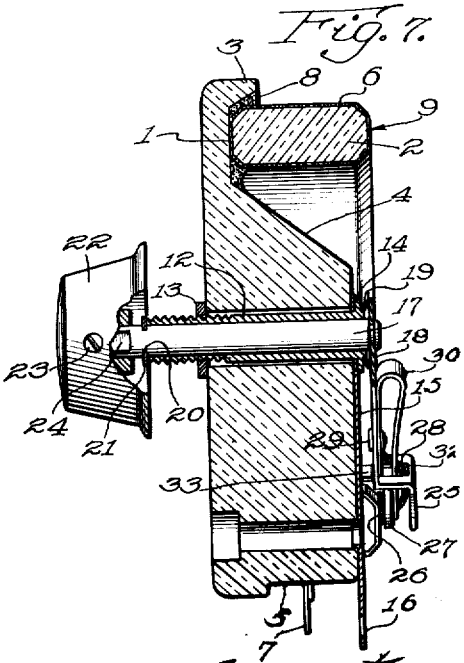
Fig. 7 is a cross section on the line 7—7 of Fig. 6.

The cut-out ring 2 is uniformly wound with resistance wire 6. Copper terminals 7 surround the ends of the core 2, and the ends are brazed to the resistance wire 6. Fusible ceramic material 8, shown in Fig. 7, fills the seat and covers the entire cutout ring 2, including the wire 6, and terminal 7. By the term "fusible ceramic material" I refer to the substance commonly used for coating ceramic products and known in the trade as a vitreous enamel slip or flux; and the term as used in the claims should be so understood. The cut-out ring 2 is then placed in its seat, with the contacting surfaces 9 uppermost. When seated, a part of the resistance 6 contacts with the base 1.

The commutation or contacting surfaces 9 and the punched ends 10 of the terminal 7 are then wiped clean and the combination is placed in a ceramic furnace, where the ceramic material 8 is fused. After the ceramic unit with embedded wires is formed, the contacting surfaces 9 are polished smooth, and the terminals 10 are ground and solder-dipped.

Through the center of the cone 4 is a central aperture 11, in which is fitted a metal bushing 12, externally threaded to receive a lock-nut 13, and provided at the opposite end with a thrust bearing 14. The thrust bearing 14 co-acts with a metal connecting strip 15, which extends from the center of the cone 4 over the raised arm 5, forming an electrical terminal 16.

The movable parts of the rheostat comprise a shaft 17, which is seated in the metal bushing 12. One end of the shaft 17 is shouldered and squared to receive a slotted sweep arm 18, which is riveted to the shaft 17. Threaded on the shaft 17 is a spring washer 19 arranged to maintain fixed tension between the sweep arm 18 and the fixed metal bushing 12 and a circular groove 20 is cut in the shaft 17 to receive a thrust washer 21 which co-acts with the threaded end of the metal bushing 12.

A control knob 22 is fastened to the projecting end of the shaft 17 by a set screw 23, which contacts with a plane surface 24 on the shaft 17. The outer end of the sweep arm 18 is bent to form a mechanical guard 25 for an independent carbon graphite button 26, which rides on the contacting surface 9.

The mechanical guard 25 is punched to form an aperture at the bend. The carbon graphite button 26 is seated in a crown top metal casing 27 and soldered to the metal casing 27 is a flexible cable 28, which is electrically connected to the sweep arm 18 by a rivet 29. The rivet 29 also fastens a double bend steel spring 30 to the sweep arm 18. The free end of the spring 30 has two apertures, through which the cable 28 is threaded in such manner that the crowned casing 27 of the graphite button is normally held under spring tension on the contacting surface through what is substantially a ball and socket joint. The spring 30 passes through the aperture 32, punched in the sweeper arm 18, and the punching 33 forms a stop for the arm through contact with the radial rib 5.

In operation the carbon graphite button rides on the polished contacting surfaces of the turns of the resistance wire and the tension between the button and the resistance wire is maintained substantially constant at all positions.

With my construction the control knob gives positive control of the location of the graphite button on the resistance wire, and the ball and socket-like mounting of the button assures positive contact with the resistance wire even though the wire and button both become worn. Experience has proved that a carbon graphite button with free seating, as here provided, and under tension, does not tend to abrade the resistance wires, and since the button bridges several wires, there is no destructive arcing at the contacting surface.

In my improved construction, the cable 28 carries substantially all the current passing through the device, thus preventing heating of the spring and deterioration of the spring temper, and one of the advantages of my construction is the formation of a compact unit, in which the heat generated is dissipated by the entire surface of the structure forming the mounting, thus maintaining under load, a comparatively low temperature.

Another important advantage of my improved construction lies in the fact that each turn of the resistance wire wound upon the supporting core is solidly backed throughout the entire length of its convolution and in the baking process each individual turn of the resistance element is solidly and entirely fused onto the supporting core which backs it up. On the under side of the core the resistance wire is also fused both to the core and to the base upon which the core is mounted. Thus each turn of the resistance element is securely fastened to the core and can in no way be displaced laterally under the sliding action of the contactor element. Regardless of the expansion of the resistance wire, that is usually resultant as the element is heated in operation, the possibility of the individual turns of wire being moved so as to vary the setting of the control knob for any certain resistance is entirely eliminated.

Although but one specific embodiment of this invention has been herein shown and described, it will be understood that certain details of the construction shown may be altered or omitted without departing from the spirit of this invention as defined in the following claims.

I claim:

1. The process of making a resistance device which consists in forming a ceramic core, tightly winding a resistance wire upon said core, providing a ceramic base having a seat, coating the wound core and the seat of the base with a fusible ceramic material, removing the said material from a limited portion of the wound core whereby to expose the top surfaces of the wire throughout said limited portion to provide an extended area of bare wire, locating the wound core in its position on the base, and baking the assembly to fuse the said material and to permanently join the core to the base and the resistance wire to the core.

2. The process of making a resistance device which consists in forming a ceramic core, tightly winding a resistance wire upon said core, securing a terminal to said core and brazing the same to said resistance wire, providing a ceramic base having a seat, coating the wound core and the seat of the base with a fusible ceramic material, removing the said material from a limited portion of the wound core whereby to expose the top surfaces of the wire throughout said limited portion to provide an extended area of bare wire, locating the wound core in its position on the base, and baking the assembly to fuse the said material and to permanently join the core to the base and the resistance wire to the core.

3. The process of making a resistance device which consists in tightly winding a resistance wire upon a suitable ceramic core, providing a ceramic base grooved to receive the wound core, coating the wound core and the groove of the base with a vitreous enamel flux, removing the coating from a portion of the surface of the wound core to provide a contacting surface on the resistance wire, seating the wound core in the groove of the base, baking the assembly, whereby the wound core and base are fused together and the resistance wire is entirely and immovably fused to the core.

4. A resistance device, comprising, in combination, a core of arcuate outline, said core being composed of ceramic material, a resistance wire wound on said core, a ceramic base having a seat, and a baked, fusible ceramic material covering said core and seat whereby said core and base are permanently joined by the fusion of said material, and said resistance wire is embedded in the fused material, a limited portion of the top surface of said wire on said core being free of said coating to provide an extended contact surface and a movable contact arm for engagement with said top surface of wire.

5. A resistance device comprising, in combination, a generally circular, ceramic core, a resistance wire on said core, a terminal secured on the core and permanently joined to an end of said wire, a ceramic base on which said core is mounted, and a baked, fusible ceramic material covering said core, terminal mounting and the surface of said base on which said core is mounted whereby said core and base are permanently joined by the fused material and said resistance wire and the terminal at the point of engagement with the wire are embedded in the said fused material, a limited portion of the wire on the core being cleaned to expose the top surface of the wire throughout said limited portion to provide an extended area of bare wire and a movable contact arm for engagement with said top surface of wire.

DAVID T. SIEGEL.